United States Patent
Denenberg et al.

(10) Patent No.: US 6,728,348 B2
(45) Date of Patent: Apr. 27, 2004

(54) SYSTEM FOR STORING VOICE RECOGNIZABLE IDENTIFIERS USING A LIMITED INPUT DEVICE SUCH AS A TELEPHONE KEY PAD

(75) Inventors: Lawrence A. Denenberg, Brookline, MA (US); Christopher M. Schmandt, Winchester, MA (US)

(73) Assignee: Comverse, Inc., Wakefield, MA (US)

( * ) Notice: Subject to any disclaimer, the term of this patent is extended or adjusted under 35 U.S.C. 154(b) by 262 days.

(21) Appl. No.: 09/725,676

(22) Filed: Nov. 30, 2000

(65) Prior Publication Data

US 2002/0064257 A1 May 30, 2002

(51) Int. Cl.[7] .................. H04M 11/00; H04M 1/64; G10L 15/04
(52) U.S. Cl. ................. 379/93.18; 379/88.02; 379/88.03; 704/251
(58) Field of Search ............... 379/88.02, 88.03, 379/88.04, 218.01, 93.18; 704/251

(56) References Cited

U.S. PATENT DOCUMENTS 5,031,206 A * 7/1991 Riskin .................... 379/93.27
5,131,045 A * 7/1992 Roth ...................... 704/237
5,204,894 A * 4/1993 Darden .................. 379/88.03
5,727,046 A * 3/1998 Almulla .................. 379/88.16
5,748,840 A * 5/1998 La Rue ................... 704/254
5,903,630 A * 5/1999 Collins ................... 379/88.24
5,995,928 A * 11/1999 Nguyen et al. ........... 704/251
6,320,943 B1 * 11/2001 Borland ................ 379/112.01

* cited by examiner

*Primary Examiner*—Fan Tsang
*Assistant Examiner*—Simon P. Sing
(74) *Attorney, Agent, or Firm*—Staas & Halsey LLP (57) ABSTRACT

The present invention is a system that uses a limited text input entry device to narrow the possibilities for the selection of a phonetically based name used in a voice dialer. The user enters a DTMF signature of a name using only one key for each letter of the name. The signature is used by a dictionary to generate likely possibilities for the word. The user is asked whether the name is the name entered via playing the name to the user. If the user confirms the choice, the phonetic representation is stored along with a corresponding telephone number. If the played word does not match, a word generator generates additional likely possibilities from the signature. A speech recognizer picks the best representation from the dictionary and generator words based on a spoken version of the name. A first name and last name procedure, in which the first and last name signatures produce separate candidate lists, is used to provide an entry to an address book for voice dialing.

17 Claims, 5 Drawing Sheets

SYSTEM FOR STORING VOICE RECOGNIZABLE IDENTIFIERS USING A LIMITED INPUT DEVICE SUCH AS A TELEPHONE KEY PAD

BACKGROUND OF THE INVENTION

1. Field of the Invention

The present invention is directed to a system that identifies and stores new phonetically based identifiers, such as names for a voice dialer and, more particularly, uses a dictionary and a word generator to produce candidates from a limited text input device, such as a telephone DTMF key pad or a spelling recognizer where there are potentially multiple candidates for the letters of a name, to produce name candidates one of which is selected by a speech recognizer.

2. Description of the Related Art

In speech-controlled systems, that is, systems where the human voice is the primary or only mode of user input, human speech is processed by a subsystem called a speech recognizer (or simply a recognizer), which may contain both software and hardware components. A typical speech-controlled system obtains a speech input (called an utterance) from a human user and uses the speech recognizer subsystem to determine which words were spoken (called the recognized text); it then uses those words to determine the actions to be carried out. Of course the recognized text will not always correctly match the utterance, since speech recognizers are still imperfect.

The current state of the art in speech recognition technology does not permit so-called "open-set" recognition, in which the human user may say anything at all and the speech recognizer determines the correct word sequence. Instead, every system that uses a speech recognizer must supply a description of the possible word sequences that the system expects to hear from the user; we call these possibilities the in-set utterances. The manner in which the in-set utterances are specified depends on the speech recognizer.

The present invention is concerned with conventional recognizers that require, as part of the specification of in-set utterances, a description of the pronunciation of each word in those utterances. The pronunciation of each word is typically provided as a phonetic spelling, a transcription of the pronunciation in a phonetic alphabet. For example, the word "phone" could be specified as being pronounced "f ow n", where 'f', "ow", and "n" are elements of the alphabet. There are several phonetic alphabets, but any particular recognizer of this class uses only one.

These systems typically provide to the recognizer a list of all the words that occur in the in-set utterances, along with one or more phonetic spellings of each word. In the so-called speaker-independent systems with which the present invention is concerned, multiple phonetic spellings of a word are often necessary because of differences in the way people pronounce words; an example is "tomayto" and "tomahto".

The maximum number of distinct words usable at anyone time depends on the particular recognizer. For simple recognizers, the maximum may be only a few dozen, or even fewer. More complex recognizers can handle hundreds or thousands of words at a time. When each utterance consists of only a single word, some recognizers can handle a few tens of thousands of words. Recognizers that handle multi-word "continuous speech" utterances are currently restricted to a few thousand or tens of thousands words at most.

As already mentioned, a speech recognition application must identify in advance all the legitimate "in-set" utterances. However, in certain applications it would be beneficial to provide the user with the ability to add new in-set utterances in the course of using the application.

For example, consider an application that permits a user to place telephone calls simply by speaking the name of the person desired. The user might say "Call John Jones". The system responds "Dialing John Jones at 555-1234" and completes the call. Such a system is called a voice dialer.

Suppose that there is a need to provide a "personalized" voice dialing service, where a user may speak a name from a personal list, unique to that user. In other words, each user has a personal address book containing a list of names and associated phone numbers, and each user's address book is distinct from that of other users. The application must first identify the user to tell which address book to use; only after the correct address book is identified can the application provide the correct list of in-set utterances to the speech recognizer.

What is needed is a system that will allow the addition of new names, with associated phone numbers, to the personal address books using only a telephone, without a computer terminal or keyboard or any other device at all, and without the need for human intervention in any way. What is more particularly needed is a system that acquires from the user, over the telephone, enough information to create a phonetic spelling of the name to be added (because that phonetic spelling must be provided to the recognizer for subsequent recognitions from this user's address book).

The reason that this problem is difficult is that a system cannot simply ask the user to pronounce the name to be added and process that utterance with a speech recognizer—since, by definition, we don't know the name to be added.

The present invention assumes that a conventional name dictionary is available and which is a list of a large number of the most common names (perhaps several hundred thousand, covering about 95% of the population) with one or more phonetic spellings for each. However, the entire dictionary cannot be provided to the speech recognizer because it contains too many possible utterances. Moreover, the name that the user wishes to add may not be in the name dictionary, since it is impossible to compile an exhaustive list of names.

Notice that in this example the system does not actually need the English spelling of the name to be added (although having that spelling would suffice). The voice dialer does not need a text representation of the names in an address book since it never interacts with the user except over the telephone; it only needs a phonetic representation of each name (which is what must be loaded into the speech recognizer) and, for each name, the associated number to dial.

For the purposes of simplicity the discussion herein will continue to use this example as a typical one for our problem—that is, the specific problem is to obtain, by telephone only, the phonetic spelling of a name. But the general problem is to determine, using a limited character set input device, such as telephone, a phonetic spelling of a word or phrase from a set much larger than can be managed by the speech recognizer, where the set (in general) is not completely known in advance.

Given a text representation of a name—that is, its spelling—it is conventional to determine an adequate phonetic spelling. For the fairly rare name that is not in the name dictionary a conventional text-to-phoneme heuristic (e.g., the so-called Navy rules) that find a reasonable phonetic transcription given a text word is used. With this approach, only an extremely rare name will yield a phonetic transcription so poor that recognition is impossible.

There are a number of different ways that a system, can obtain a text representation of a name over the telephone.

One method is to recognize letter spelling using a speech recognizer. This is essentially a speech recognition problem with only twenty-six "words." A phonetic spelling for each letter is created, any sequence of letters is permitted as a legitimate utterance, and the user is asked to spell the name. The problem with this method is that speech recognition of the alphabet is extremely poor, since (a) all letters but one consist of a single syllable, giving the recognizer little chance at differentiation, and (b) many letters sound very much alike except for subtle distinctions difficult to detect with current recognition technology. Using letter spelling in conjunction with a dictionary of names when the word being spelled is in the dictionary works better, but still not well enough for all applications, such as voiced based dialing, because it is highly possible that a surname will not be in the dictionary.

To overcome the low accuracy of recognizing letter spelling, the user can be instructed to spell using a "phonetic alphabet" of the form Alpha, Bravo, Charlie, Delta, and so forth. This greatly improves spelling accuracy, but has the drawback that the user must learn the twenty-six equivalents for the letters of the alphabet.

Another possibility is to use Dual-Tone Multi-Frequency (DTMF) keys, sometimes called TOUCHTONE keys for spelling. There are several conventional approaches used for spelling with DTMF keys, using two key presses for each letter. For example, first press the key that contains the letter, then press 1 if the letter is first on the key, 2 if the letter is second on the key, and 3 if the letter is third on the key. So, for example, letter A is entered as 21, letter K is entered as 52, and letter S is entered as 73. The star key is typically used to denote the end of the name. The difficulty with this scheme is that it is slow, tedious, and error-prone, even with practice.

What is needed is a system that will overcome the above-described problems.

SUMMARY OF THE INVENTION

It is an object of the present invention to provide a system that inputs phonetic spellings of a voice recognizable name using a limited character input device which provides an input corresponding to a number of different possible words.

It is another object of the present invention to use a telephone to input spellings of a word via a key pad or voice.

It is a further object of the present invention to provide a voice dialer that dials using names.

It is also an object of the present invention to use speech recognition with letter by letter spelling a voice recognizable name.

It is another object of the present invention to allow applications, such as call routers, to be provisioned in a way that does not require a system administrator to use a screen interface to set up the names.

The above objects can be attained by a system that uses a limited text input device to narrow the possibilities for the selection of a phonetically based name used in a voice dialer. The system allows a user to enter a DTMF or voice spelled signature of a name; a signature is a sequence of alpha or numeric digits which has a number of possible interpretations and which can be called a multiple word possibility input sequence. Since the signature could actually represent any of a multiplicity of names, a dictionary is used to generate likely possibilities or candidates for the phonetic spelling of the word. A word generator generates additional likely possibilities from the signature. A speech recognizer picks the best representation from the list of names associated with the signature based on a spoken version of the name. The selection possibilities can be narrowed by asking the user if a high probability phonetic spelling candidate is the name. A first name and last name procedure, where the signatures produce separate candidate lists is used to provide an entry to an address book, is used for voice dialing.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The description of the invention herein will discuss the use of conventional Dual-Tone Multi-Frequency, or DTMF, commonly called "touchtone," as a mode of input for telephony systems. The standard DTMF telephone has a keypad containing twelve DTMF keys, labeled 1, 2, 3, 4, 5, 6, 7, 8, 9, 0, # (number sign), and * (star). Most letters of the alphabet are associated with the touchtone or DTMF keys in a standard fashion: A, B and C with 2; D, E, and F with 3, and so forth. The associations for Q and Z vary, and the discussion herein will assume that some convention has been chosen for all letters. The salient feature of DTMF input is its high reliability; it is easy for a computer system to identify DTMF keys as they are pressed, with effectively 100% accuracy.

Figure 1:
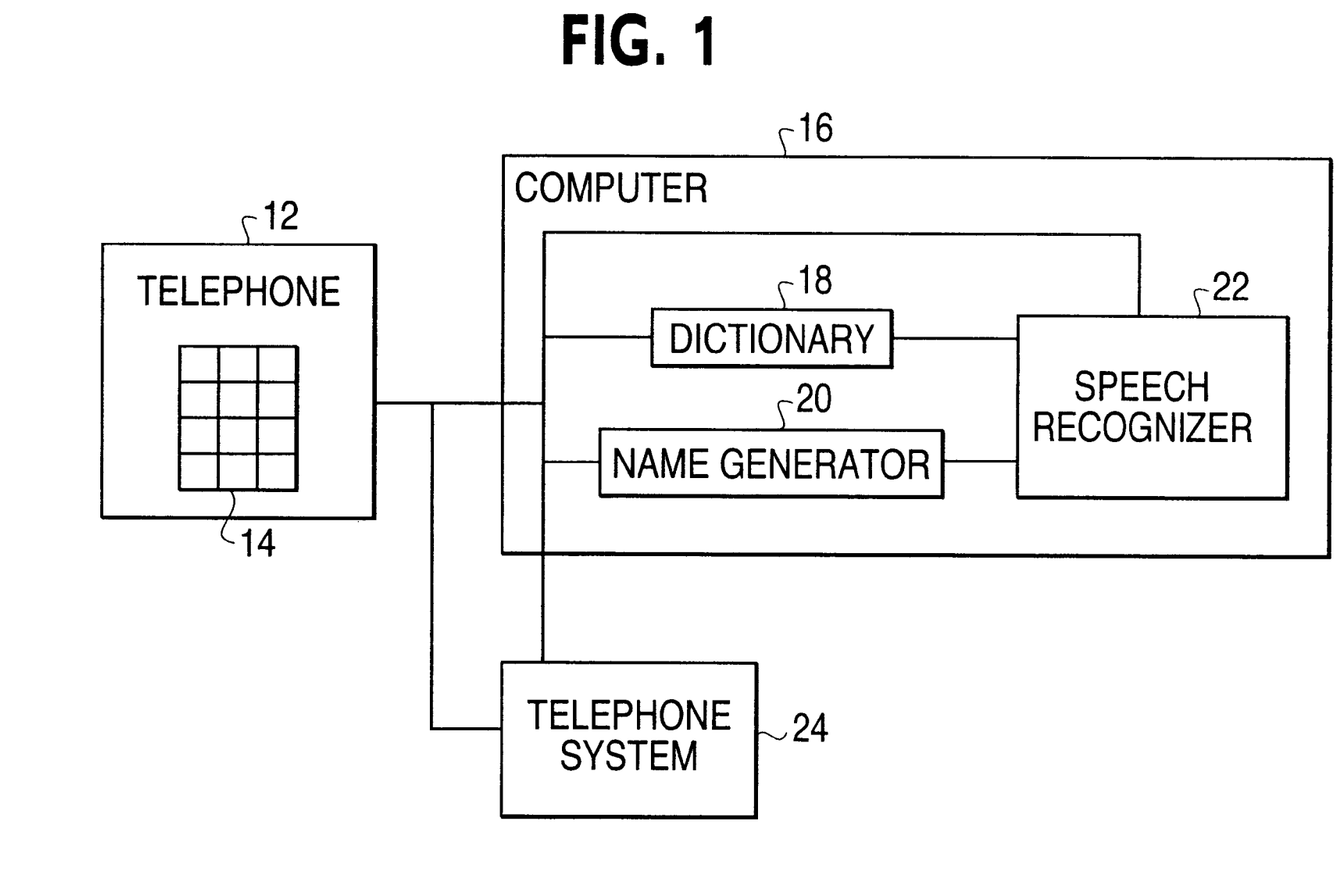
FIG. 1 depicts components of the present invention.

A system 10 according to the present invention includes, as depicted in FIG. 1, a conventional telephone 12 having a DTMF key pad 14 input which is operated, in one approach, by a user to supply a DTMF spelling of a name, where there is one key press per letter, to be added to a storage for later recognition, such as to a personal voice recognition "address book" of a computer system 16. The DTMF spelling is provided to a conventional dictionary 18 and a conventional name generator 20. These applications 18 and 20 produce phonetically spelled name candidates for the name to be added. These candidates, preferably a total of about one-hundred, are presented to a conventional speech voice recognizer 22. One or more of the candidates are presented to or conventionally played to the user at the telephone. The user provides an input concerning the candidates and speaks the name and the system 16 stores a selected one of the candidates as the name in the voice recognition address book along with a telephone number associated with the name. The recognizer 22 receives a list of potential words each with a phonetic representation along with the digital version of the spoken name and indicates which of the names of the list is the most probable one spoken. This is the name from the list used for future recognition operations.

At a later time the user speaks the name added to the address book into the telephone 12. The recognizer 22 determines the spoken name in the address book, can confirm that the name is correct by speaking/playing the name to the user and provides the corresponding telephone number to a telephone system 24 which "dials" the telephone number for the user.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The present invention obtains names or other open-set utterances drawn from a large universe mostly (but not necessarily completely) definable in advance. A typical procedure, again using the example of a user attempting to add an arbitrary name to a personal address book, starts (see FIG. 2) with the user being asked to and entering 42 the name using the DTMF key keys, but using only a single key per letter (that is, using the 2 key for A, B, or C, the 3 key for D, E, or F, and so forth) ending, say, with the star key. For convenience, we call this a single key DTMF input sequence. If the name is KOMER, for example, the user would enter "56637*". Performing this task is much simpler and more intuitive for the user than using the two DTMF keys per letter technique previously noted. Of course, we cannot determine the spelling of the name from this multiple name possibility DTMF sequence. The DTMF sequence corresponding to a given name is called the signature of that name, so that KOMER has signature 56637.

The signature can also be a voice spelled signature as will be discussed in more detail later.

Figure 2:
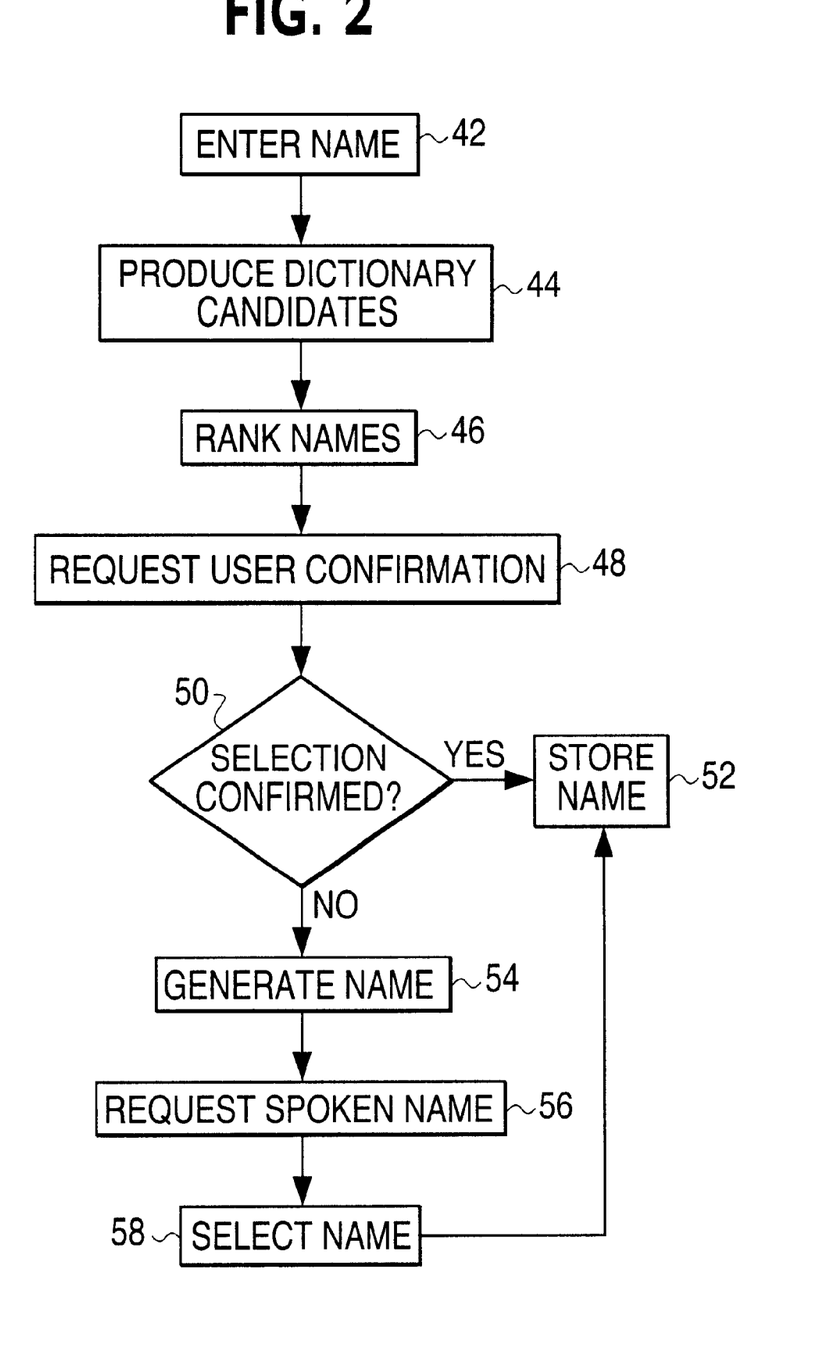
FIG. 2 shows operations of the invention.

Next, the system determines 44 which names in the dictionary 18 have the signature entered by the user. In the example (and with a conventional dictionary) those names would be JONES, LONES, LONER, JOMES, KOMER, JONER, and KOMES—all have signature 56637. The actual name intended by the user may of course not be in this list.

The dictionary 18 also includes frequency information, that is, the dictionary ranks 46 the names according to their prevalence in the general population. The system can therefore determine that JONES is by far the most common name among those with signature 56637. The computer system then asks 48 the user a question such as "Is the name JONES? Please say yes or no." If the user says "yes", that is, if there is a match 50, the task is complete and the name (and corresponding telephone number) is stored 52. In this example, the user will say "no." The system could now eliminate JONES from the list of possible names (but it does not; see further discussion of this point below).

The system will now use the speech recognizer to distinguish among the remaining possibilities, of which there are only a handful. However, it is possible that the user's name is not in the dictionary (as would be the case in our example if the name were KNOER, which also has signature 56637). The system uses the name generator 20 to generate 54 a number of "names" that have signature 56637 but are not in the dictionary 18. The method for generating these names is described more completely below. Since the system cannot simply consider all possible letter sequences with the given signature (there are too many of them), the idea is to generate names in which the sequence of letters most closely resembles those in real names. For example, although KONEP and JMMDP both have signature 56637, the former is preferred since it is more likely to be a name. The system uses text-to-phoneme heuristic (the conventional Navy Rules) to synthesize a pronunciation of each generated name. (Of course the system cannot look up the pronunciation of a generated name in the name dictionary, since by definition it's not there.) The system now has in hand those dictionary names whose signature is 56637, plus the generated names—a reasonably small set, whose size can be controlled since a predetermined number of names can be generated. The system now asks 56 the user to state the name, and the speech recognizer 22 is used to select 58 the best match among this set. The phonetic spelling of the resulting name is stored 52 and used to represent the new name in the user's address book.

This above discussed procedure has been found effective at finding a name for addition to a user's address book. The present invention can also use several variants of this procedure that are discussed below after examining the individual steps in more detail.

The present invention asks the user to spell the name (or other word) using DTMF in the simplest way possible: using the letters printed on the telephone keys (with some convention for letters Q and Z), one letter per key-press, ending with (say) a star. The sequence of keys entered forms a signature, and then the system extracts from the name dictionary all names that have that signature. (The extraction can be performed in negligible time, regardless of the size of the dictionary, by preprocessing the dictionary into appropriate sorted form using well-known algorithms.) In this way the system can ignore most of the entries in the dictionary, limiting the problem to (a) names with the given signature, plus possibly (b) unknown names those not in the dictionary—with the same signature.

When the dictionary is exhaustive (that is, when the desired word must be in the dictionary, which is not so in the case of names) then two cases merit special consideration: If there is only one name in the dictionary with the given signature, then the problem is solved, and the system can proceed immediately to the confirmation and storage operation. If there is no name in the dictionary with the given signature, then the user has made an error and can be so informed.

Where probability information is available, as in the case of names, the system can immediately identify a most-likely candidate: that name among those in the dictionary that has the highest probability. In the case of names, the probability of the highest name is typically overwhelming compared to all other names of the same signature, and asking for a Yes/No confirmation of that name is a useful alternative since doing so often gives an exact answer without the need for the user to say the full name.

However, in most cases the system needs to ask the user to say the full name regardless, because the system needs a "voice token," that is, a recording of the user saying the name, to be played back to the user later as necessary. The system may well ask for the name in any case, to keep the procedure uniform from the point of view of the user.

When the dictionary is not exhaustive, as it never can be with names, as noted previously, it is possible that the user's desired name is not in the dictionary. To handle this case, the system generates a number of "names," that is, letter sequences, all of which have the signature entered by the user.

One method of ensuring that these generated names are the most reasonable among the many possibilities is the technique discussed below. From a large list of possible names, the following frequencies for each letter x and y of the alphabet are calculated:

F(•x): the relative frequency of letter x at the beginning of a name.

F(xy): the relative frequency of letter y following letter x in a name.

F(x•): the relative frequency of letter x at the end of a name. The prefix score (PS) of a letter sequence w=xyz . . . uv is defined as:

$$PS=F(•x)*F(xy)*F(yz)* \ldots *F(uv)$$

The prefix score of w is a measure of the likelihood that w is a prefix of a name. The name score (NS) of w is defined to be its prefix score times F(v•) where v is the last letter of w; this is a measure of the likelihood that w is itself a name. For example, the NS of SMITH is $$NS=F(•S)*F(SM)*F(MI*F(IT)*F(TH)*F(H•)$$

Note that name and prefix scores are comparable only between letter sequences of the same length.

Given a signature S, it is not practical to calculate the scores of all letter sequences with signature S, since there are too many of them. Instead the system proceeds as discussed below, again taking signature 56637 as an example.

Begin with the one-letter sequences whose signature is 5; that is, J, K, and L. Associate each with its prefix score. Now extend each of these sequences to form the two-letter sequences with signature 56; producing JM, JN, JO, KM, KN, KO, LM, LN, and LO. With each associate its prefix score. Now prune the choices in hand by retaining only the best ones, that is, those with the highest score. Suppose, in this example, that only the top five choices are retained. In the example under consideration these might be JO, KM, KN, KO and LO—the others are discarded.

Next, each of the choices is extended by another letter. In the example the system produces JOM, JON, JOO, KMM, KMN, KMO, and so forth, up to LOO, for a total of fifteen possibilities. Then, calculate the score of each and discard all but the top five. The name generator system continues in the same way. After the final extension to the full signature, the score of each remaining candidate is calculated and the generator prunes away all but the top five, and are left with five high-scoring names—not necessarily the five letter-sequences with the highest possible score, but good candidates for names of the given signature.

In practice, the system produces, via the dictionary and the generator, about a hundred names because the goal of the procedure is to cover the space of possible names with the given signature and because that is the practical limit for effective selection by the speech recognizer. The system should be designed to have or implemented with enough generated names to "fill out" the phonetic space of names with the given signature, at which point for practical purposes the preference is to accept the name that is the phonetically closest to the actual name. The result need not be exactly the name that the user intended; it is enough for this name to be the one selected from the address book when the user says the intended name. Note that the primary goal is to get a name that sounds like the name that the speaker has spoken because most names are phonetically separable (for example, "Larry" is phonetically very distinguishable from "Chris") and therefor having an exact phonetic representation is not always needed. As a result, taking the highest ranked name will often be sufficient.

There are several variations of this name-generating procedure. For example, since all of the generated names might begin with the same first letter, it is possible to more thoroughly cover the space of possible names by running the algorithm three times, once for each of the letters on the first key of the signature. In this way a representative name starting with each of the three possible letters is guaranteed. Another possibility is to use trigram frequencies instead of the bigram frequencies described here.

After the generation operation the system has two sets of names: one set (which may be empty) obtained by finding all names in the dictionary that match the signature, and one obtained by the name-generating procedure of the previous section. Each dictionary name has one or more pronunciations; for the generated names a pronunciation is generated (using, say, the Navy rules mentioned above, or any conventional text-to-speech heuristic).

Here is a subtlety. When the two sets of names are combined, the combined set is very likely to have duplicates, since the generating rules will typically generate the known names. However, it is preferable not to eliminate these duplicates, since the Navy rules will occasionally generate a pronunciation not in the dictionary—which may be closer to the actual pronunciation.

Similarly, the most-probable dictionary name from the list should not eliminated, even though the user may have already repudiated it. It may be that the user misunderstood, or is using a pronunciation of the name other than the one said. (For example, if the most probable name is LEVINE, and the system asks "Is the name LEVEEN?" the user may say "no" because the correct pronunciation is 'LEVIGN'.) And preferably the system must also guard against the possibility that the user did say "yes" and that the recognizer made a mistake, which this covers.

After the name sets are combined and the user is asked to say the name, and the recognizer is used to select the most likely of the possibilities in the combined set. The resulting name and its phonetic representation are taken as the chosen name. Note that the text representation returned by the user is not very useful as a user-visible spelling in the case of generated names, because it is often incorrect.

Another possibility, not illustrated in the procedure of the previous discussion, is to ask the user to spell (verbally) the name, letter by letter. As mentioned above, unconstrained letter spelling is a difficult recognition problem with current technology, but the problem here is much more restricted: the recognizer is restricted to selecting from only those letter sequences with the typed-in signature. In this way, the system knows not only the number of letters that will be spoken, but also the restricted possibilities for each position of the name. So with the example signature 56637, the first letter can be only J, K or L; the second must be M, N, or O; and so forth. This is a much more tractable recognition problem than open spelling, where even the length of the word is not known in advance. Indeed, with DTMF-constrained recognition there are only a handful of highly confusible pairs: B and C (since both appear on the 2 key), D and E, J and K, M and N, T and V. The overall accuracy rate of signature-constrained recognition is much higher than that of open spelling recognition.

Figure 3:
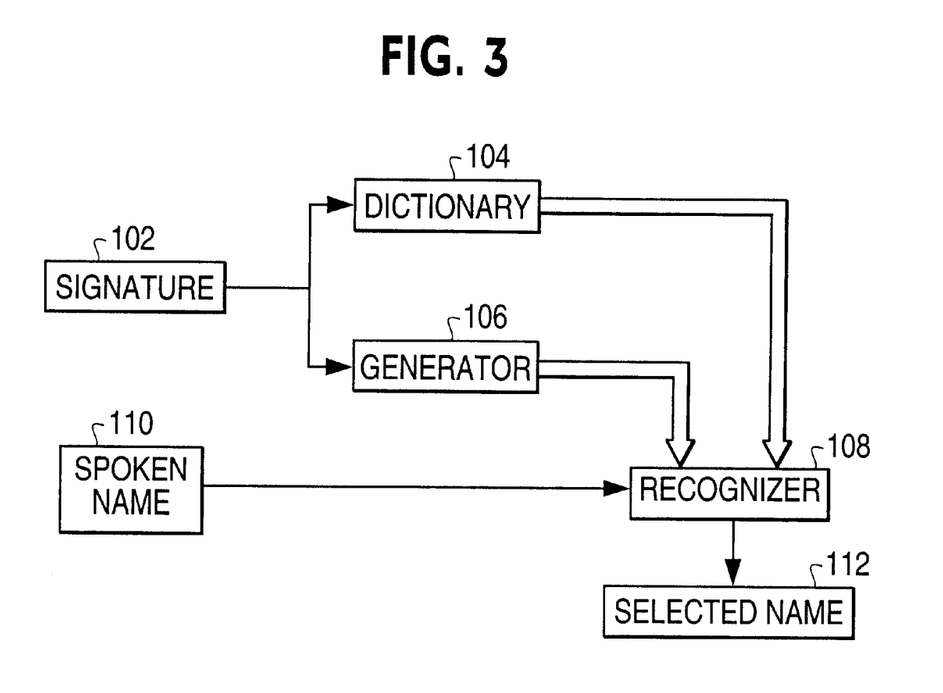
FIG. 3 shows a second single word DTMF embodiment of the present invention.

Among the single name alternatives discussed above an alternative is generally preferred. In the generally preferred single name alternative (see FIG. 3) the DTMF signature is used by the dictionary 104 to produce all of the possible names of which the user is asked to confirm whether the highest ranking name is the entered name. The name generator 106 produces the one-hundred highest ranking generated names. From the combined set of names the speech recognizer 108 selects the best match to the spoken name 110 as the selected name 112.

Figure 4:
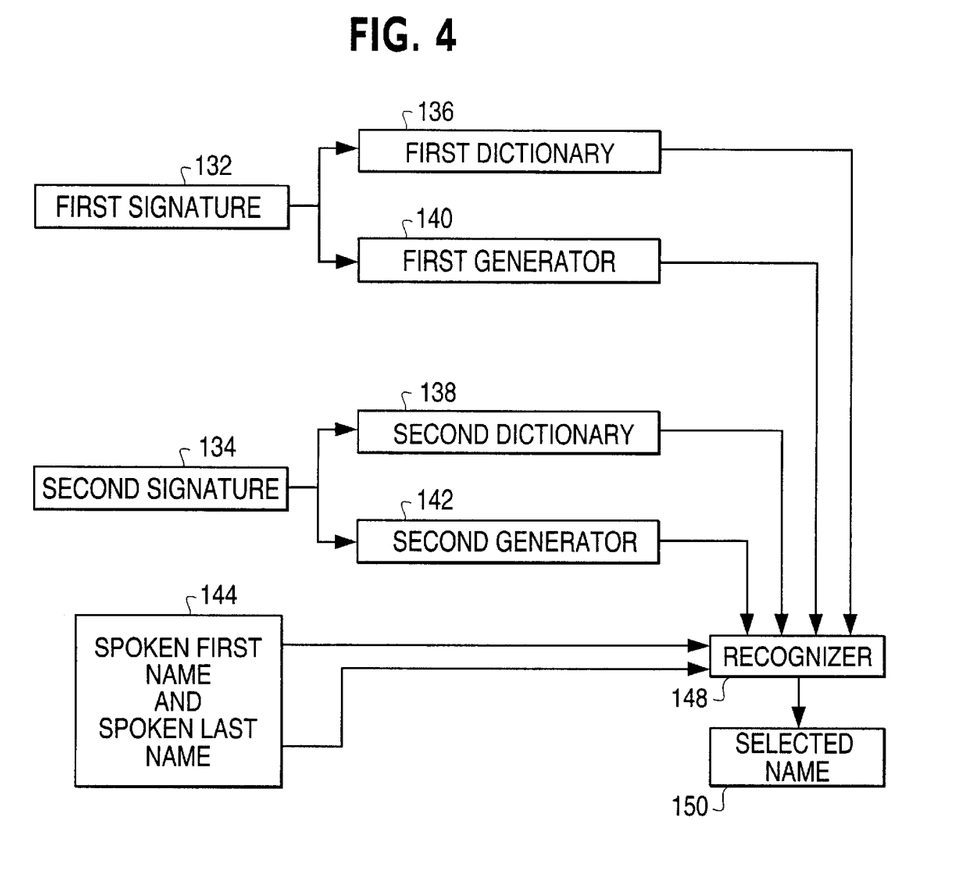
FIG. 4 shows a two word DTMF embodiment of the present invention.

Up to now the system has been using a single name, the last name, as the canonical example of the input to be obtained from the user. In an actual address book application, the user will of course wish to add entries that have both a first and last name, such as "John Jones". A preferred approach using first and last names is depicted in FIG. 4. In this embodiment first 132 and second 134 signatures are presented to respective first 136 and second 138 dictionaries and first 140 and second 142 name generators and the highest probability names from each are supplied to the recognizer 148. Of course, the candidate list can be generated from voice based spelling, DTMF based, voice based spelling constrained by DTMF, etc. as previously discussed. After a confirmation attempt, the spoken first and last candidate names 144 are presented to the speech recognizer 148 and the selected name 150 is produced.

In this embodiment, distinct dictionaries for first and last names are used, each with relative frequency information, and then the system carries out (some variant of) the procedure above to acquire the first and last names independently. Below are discussed other alternatives.

First of all, the system starts by obtaining the signature, DTMF and/or verbally spelled, for both the first and last names before going on to the next step. ("Spell the first name, ending with the star key. . . . . Now spell the last name, ending with the star key.") In this way the user does all necessary keypad and/or verbal spelling work at once, rather than being forced to alternate between DTMF and speech.

The user is asked about the most-probable first name and last name. ("Is the first name John? Please say yes or no.". . . "OK, is the last name Jones? Please say yes or no.") Again, the user does not have to intermix DTMF with spoken utterances. Of course the system can ask only one of these questions, or perhaps even neither one, if the given first or last name signature matches none in the name dictionary.

If the user says "yes" to both queries then the system is done and the first-last name and corresponding telephone number can be stored. If the user says "no" to either question the system next asks for the full name, rather than asking for the first and last names individually. This has several advantages: It is easier and faster for the user; it provides the system with a voice of the full name (which may be needed in any case); and, in the case where the user said "yes" to one question but not the other, the recognition process is more accurate, since knowing part of an utterance improves accuracy on the unknown part.

This procedure also deals with an issue of co-articulation. Co-articulation is the speech production phenomenon where the pronunciation of a letter of syllable is influenced by the letters or syllables around it. For example, "chocolate" may be spoken as a two syllable word instead of three, due to co-articulation. Having the user speak both first and last name together captures the way they are really spoken. For example, in 'Chris Schmandt' we generally pronounce only a single "s" sound since the first name ends with the same sound as the beginning of the surname.

As a variant of this procedure, the system could ask the user about the most-probable first and last names in a single question ("Is the name John Jones?"). The system can do this only when it has names for both entered signatures, but in this case the system saves one user interaction. If the user says "no," of course, the system does not know either the first or the last name.

Any real address book application must handle "names" like "Home" or "Mother." This is handled by permitting the user to enter a zero-length last name. The actual system must also have facilities for the user to start over, correct errors, and so forth.

The present invention is also applicable when the limited input or multiple word possibility input sequence is the result of only a spelled name input to a voice recognizer. In this embodiment the user spells the name, by voice, and then says it. This embodiment parallels the user typing a name on keypad and then saying it. The same algorithm for speech recognition entry is used. Instead of typing the name in DTMF keys and then speaking the whole name against a grammar composed of the set of possible matches based on DTMF spellings, the user recites the letters. These spoken letters 183 (see FIG. 5) are presented to a speech recognizer 184 designed to recognize spoken letters. Because of the similarity of the sounds of the letters, the fact that they are each spoken as short mono-syllabic utterances, and the limitations of current speech recognition technology, each recognized letter could be one of a set of possible spoken letters. Just as the touch tone '2' could be "a", "b", or "c", if the speech recognizer hears 'a' the person may have actually said "a", "j", or "k" (the so-called A-set). In this embodiment, the representation (signature) is one in which each equivalence class of letters is replaced by one representative member of the class: a=a, j, or k; e=b, c, d, e, g, p, t, or v; f=f or s; i=i or y; m=m or n, and any letter not listed is simply itself. In short, some letters are much more confusable than the 3-to-1 ambiguity that occurs using DTMF, some are much less so. The name "chris" is represented "ehrif', while "larry" is represented by "larri".

Figure 5:
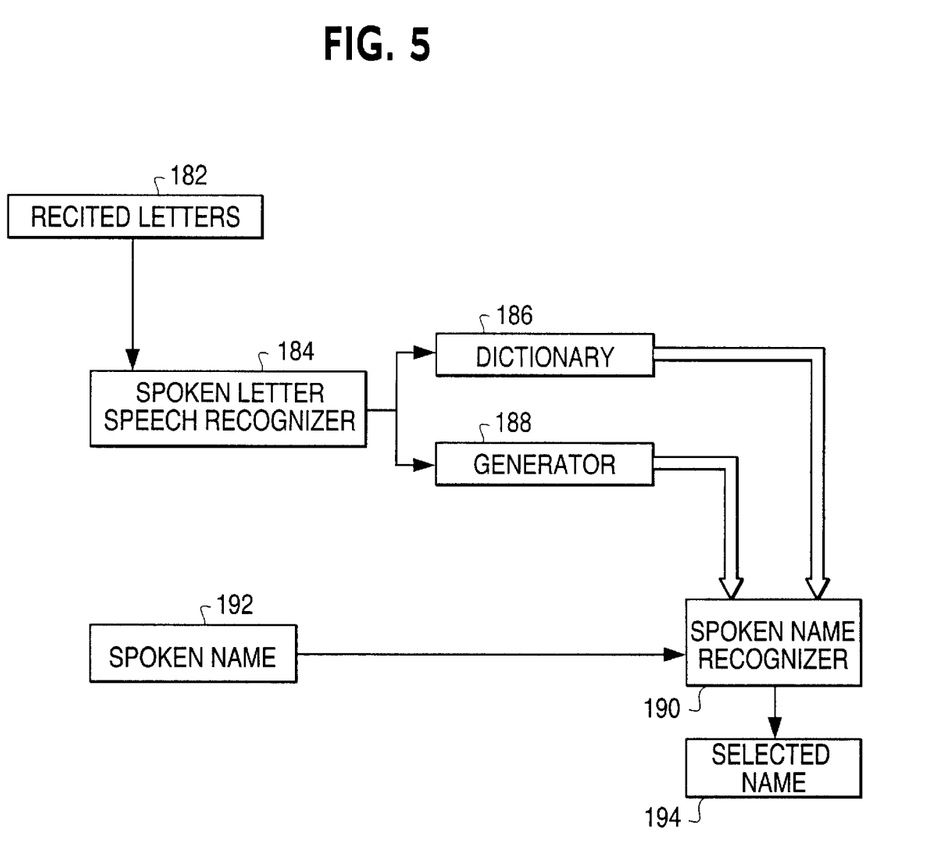
FIG. 5 depicts a spoken letter embodiment of the present invention.

Assume for simplicity that errors are symmetric and equiprobable, i.e. when the user says any of 'a', 'j', or 'k' the recognizer will report either "a", "j", or "k" with probability 1/3. Thus, the signature for the spoken letters "m", "a", "r" and "k" could result in a number of different signatures. For example, take the dictionary of names; wherever the recognizer see a, j, or k they could be replaced with just the letter "a". So the spoken word "mark" becomes the signature "mara". When the user spells "mark" the recognizer could recognize mara, mjrj, mkrm, marj, mark, or mjrk, but the system makes the same replacement so any of these becomes "mara". The signature is then presented to the dictionary 186 and the name generator 188. The dictionary 186 would match and produce mara and could also match/produce "marj" or "mark" as they, too, would have a signature of "mara" if these words are indeed in the dictionary. Even if mara and marj were not in the dictionary, the generator 188 generates them in the second operation of the algorithm as phonetically possible names based on the signature. That is, the generator 188 once again generates the possible words (mara, mjrj, mkrm, marj, mark, or mjrk) from the signature. The dictionary produced words and the generator produced words are presented to a spoken name recognizer 190. So now against a grammar of mark, mara, marj, etc. the system has the user speak the name 192 and presumably hear "mark". The recognizer 190 performs the comparison and produces the selected name 194.

The above-discussed embodiment uses a representation or signature which is reasonable given how the spoken form of our letters sounds, but it can be any such mapping depending on which letters a particular recognizer finds confusing. A particular recognizer, for example, may find "a" and "j" confusing, but never "k". In this case, "a" in the signature represents either "a" or "j" and "k" represents itself.

In practice the confusions are not, in fact, equiprobable. To deal with this issue, probability can be used to assign weighting to the names in the "spell the name" part of the algorithm, for example, when the user says "k" it is actually recognized as "k" twice as often as "a" and four times as often as "j", then "mark" is twice as likely as "mara" and four times as likely as "marj". These probabilities can be used to guide what signature is produced by the recognizer 184.

Depending on the particular application, there can be combinations and variations of the methods above. Several examples are discussed below.

If a faster system is desired, the system can skip asking the user about the most likely name with the given signature. This avoids an entire prompt/response interaction set; the user presses the DTMF keys, spells the name or both, says the name, and is done. An added advantage here is that the user always performs the same actions (DTMF then one utterance), whereas in the method described above the query (or queries) about the most probable name(s) will not always happen.

On the other hand as an alternative, the system can obtain higher accuracy at the cost of slower entry time by asking the user about all of the dictionary names with the given signature(s), when more than one exists. ("Is the name Jones?" "OK, is it Lones?" and so forth.) The system continues to ask either until the user says yes, until there are no further names with the given signature in the dictionary, or until the system hits a preset limit. In the latter two cases, the system proceeds as usual by generating names and asking the user to say the name.

One example previously discussed asked the user to say the name and did not use constrained spelling at all. The system can also use constrained spelling on the DTMF signature in place of asking the user to say the name, or the system can both ask for a pronunciation of the name and for a constrained spelling, combining the results.

As already mentioned, characteristics of the dictionary may influence the choice of methods used. If the dictionary contains an exhaustive list of the possible words, the system need never generate potential words using the bigram or trigram method discussed above. If the dictionary has no frequency information, then the system cannot ask about the most likely word; the system may ask about all words with the given signature, or may ask about one or more chosen at random without regard to frequency, or may skip this step.

The present invention has been described with respect to the creation of address books for voice dialing, however, the present invention could also be used to create lists of entries for automated attendant response selections.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
    producing phonetic word candidates using a multiple word possibility input sequence of a word, according to a word dictionary and a score-based word generator that generates phonetically possible words based upon the input sequence; and
    selecting, using a speech recognizer, one of the produced word candidates for storage based upon the produced phonetic word candidates and using a spoken version of the input word during the selecting.

2. A method as recited in claim 1, wherein the multiple word possibility input sequence comprises a DTMF sequence.

3. A method as recited in claim 1, wherein the multiple word possibility input sequence comprises a verbally spelled sequence.

4. A method as recited in claim 1, wherein the input sequence is a multiple name possibility DTMF sequence.

5. A method as recited in claim 4, wherein the producing comprises:
    producing a first set of name candidates using a dictionary; and
    generating a second set of name candidates using a score based name generator.

6. A method as recited in claim 5, wherein the producing further comprises:
    presenting a highest probability dictionary candidate to a user for selection; and
    storing the highest probability candidate as the phonetic based spelling of the multiple name possibility DTMF sequence when selected by the user.

7. A method as recited in claim 6, further comprising:
    storing a telephone number corresponding to the phonetic based spelling; and
    performing voice dialing operations using the phonetic based spelling and the telephone number.

8. A method as recited in claim 4, wherein the producing comprises producing a set of name candidates using a dictionary.

9. A method as recited in claim 4, wherein the producing comprises generating a set of name candidates using a score based name generator.

10. A method as recited in claim 1, wherein input sequence comprises first and last name signatures.

11. A method as recited in claim 10, wherein the producing comprises:
    producing first and last name dictionary candidates using first and last name dictionaries; and
    producing first and last name generated candidates using first and last name score based name generators.

12. A method as recited in claim 11, wherein the producing further comprises:
    presenting a highest probability first and last name dictionary candidates to a user for selection; and
    storing the highest probability candidates as the corresponding phonetic based spellings of the multiple name possibility DTMF sequences as selected by the user.

13. A method of voice dialing, comprising:
    inputting by a user a multiple name possibility single key DTMF input sequence comprising first and last name signatures via a DTMF telephone key pad;
    producing phonetic name candidates using the input sequence, said producing comprising:
        producing a first set of first and last name candidates using first and last name dictionaries responsive to the signatures; and
        generating a second set of first and last name generated candidates using first and last name score based name generators responsive to the signatures;
    selecting one of the produced candidates from the produced first and second sets of name candidates for storage using a spoken version of the name by the user during the selecting using a speech recognizer;
    storing a telephone number corresponding to the stored candidate; and
    performing recognition voice dialing using the stored candidate and the telephone number.

14. The method of claim 13, wherein the producing further comprises:
- before the selecting audibly presenting a highest probability first and last name dictionary candidate from the first set to the user for selection; and
- storing the highest probability candidate as the selected phonetic based spelling of the multiple name possibility DTMF sequence, if selected by the user.

15. An apparatus, comprising:
- a DTMF telephone inputting a multiple name possibility DTMF sequence as a name and a spoken version of the sequence spoken by a user; and
- a computer producing phonetic name dictionary candidates using a multiple word possibility input sequence as input to both a phonetic dictionary and a score based name generator, and selecting one of the produced name candidates for storage using the user spoken version of the sequence.

16. The apparatus of claim 15, wherein the computer further allows the user to confirm whether a highest probability phonetic name from the dictionary candidates and from the generated name candidates using the score based name generator is the name, and performs the selecting if the highest probability name is not the name.

17. A computer readable storage storing at least one program and controlling a computer according to a process comprising:
- producing phonetic word candidates using a multiple word possibility input sequence of a word, according to a word dictionary and a score-based word generator that generates phonetically possible words based upon the input sequence; and
- selecting, using a speech recognizer, one of the word candidates for storage based upon the produced phonetic word candidates and using a spoken version of the input word by-The during the selecting.

* * * * *

UNITED STATES PATENT AND TRADEMARK OFFICE
CERTIFICATE OF CORRECTION

PATENT NO. : 6,728,348 B2
DATED : April 27, 2004
INVENTOR(S) : Lawrence A. Denenberg et al.

It is certified that error appears in the above-identified patent and that said Letters Patent is hereby corrected as shown below:

Title page,
Item [54], Title, insert "A" before "SYSTEM";
Item [56], References Cited, U.S. PATENT DOCUMENTS, please add:
-- 4,674,112    6/1987       Kondraske et al.
4,754,474    6/1988       Feinson
4,866,759    9/1989       Riskin
5,031,206    7/1991       Kim et al.
5,255,310    10/1993      Kim et al.
5,828,991    10/1998      Skiena et al.
5,912,949    6/1999       Chan et al.
5,999,611    12/1999      Tatchell et al.
6,018,736    1/2000       Gilai et al.
6,061,654    5/2000       Brown et al.
6,064,723    5/2000       Cohn et al.
6,150,962    11/2000      Rossman --;
FOREIGN PATENT DOCUMENTS
Please add -- WO 98/30014    7/1998    PCT --.

Column 14,
Line 16, delete "by-The".

Signed and Sealed this

Ninth Day of August, 2005

JON W. DUDAS
*Director of the United States Patent and Trademark Office*